Feb. 7, 1933.  J. W. CAIN  1,896,192
BARBECUE OVEN
Filed July 15, 1931   2 Sheets-Sheet 1

Inventor
J. W. Cain
By Clarence A. O'Brien
Attorney

Feb. 7, 1933.  J. W. CAIN  1,896,192
BARBECUE OVEN
Filed July 15, 1931    2 Sheets-Sheet 2
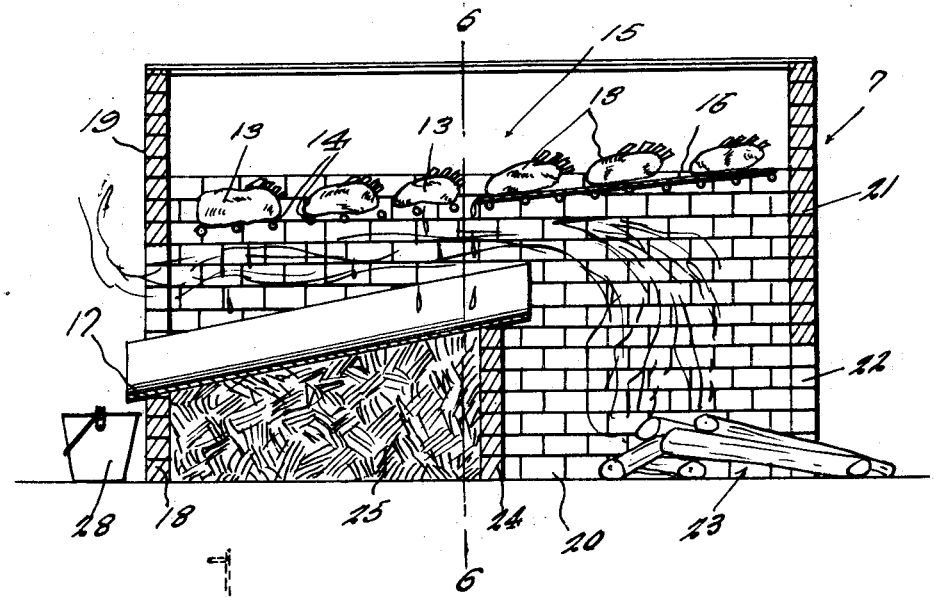
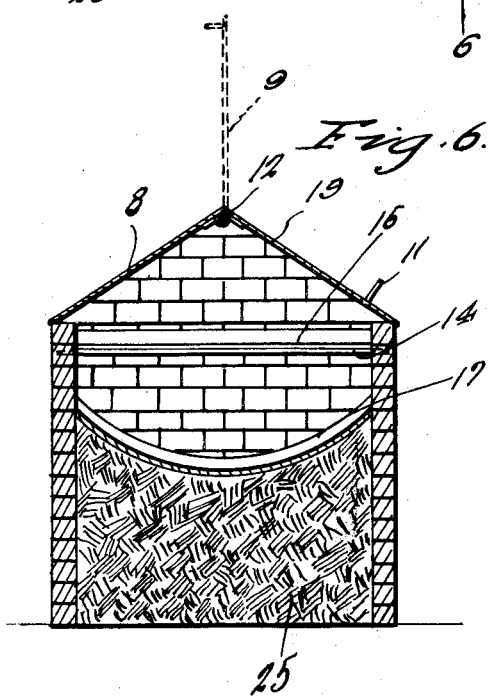
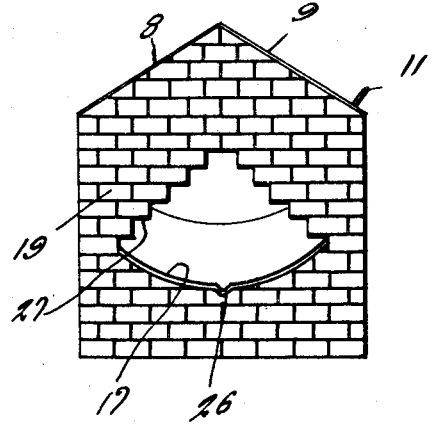
Inventor
J. W. Cain
By Clarence A. O'Brien
Attorney Patented Feb. 7, 1933

1,896,192

UNITED STATES PATENT OFFICE

JULIUS WILLIAM CAIN, OF DALLAS, TEXAS

BARBECUE OVEN

Application filed July 15, 1931. Serial No. 551,000.

This invention relates to an improved and unique structure for cooking edibles, but especially designed for cooking meats barbecue style.

I am aware of the fact that there are various types of enclosures and machines embodying rotary meat supports and many different types of heat generating devices for subjecting the meats to direct cooking action. Without attempting to specifically portray the construction of these various kinds of appliances, I merely wish to introduce my invention by saying that it is regarded as a relatively and comparatively novel oven for utilizing a dependable source of combustion and heat for subjecting the meat to an entirely different cooking action than is at present known to me.

The novelty is predicated upon a conception involving profound thought resulting from much experimental work and characterized by a structure expressly designed to subject the meat to a more or less indirect smoking and meat cooking process.

The inventive conception, founded upon studious development, comprehends a suitably proportioned brick or masonry housing having embodied therein a selection of properly arranged co-operating details to define the various structural features and to enable me to accomplish the desired result in a highly satisfactory manner.

More explicitly recited, certain novelty is based upon an especially designed brick oven having internal structural parts constituting a practical meat support and constructed to promote a unique heat and air circulation whereby to subject the meat products to the action of the particles of combustion, smoke and heat so as to thoroughly cook said meat products and to lend individuality in taste and flavor in order to promote successful commercial results.

The explicit structural parts and relative association and arrangement will become more readily apparent from the following description and drawings.

In the drawings:

Figure 4 is an opposite end view that is, observing the structure in a direction from left to right in Figure 1.

Figure 5 is a central longitudinal or vertical sectional view through the entire structure.

Figure 6 is a transverse vertical section on the line 6—6 of Figure 5.

Figure 1:
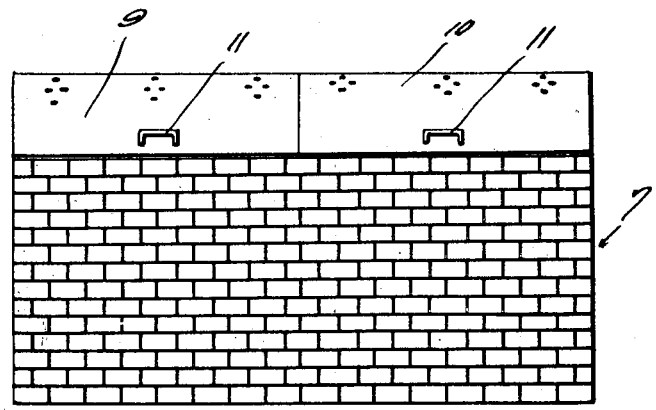
Figure 1 is a side elevational view showing the exterior configuration of the improved oven.
Figure 2:
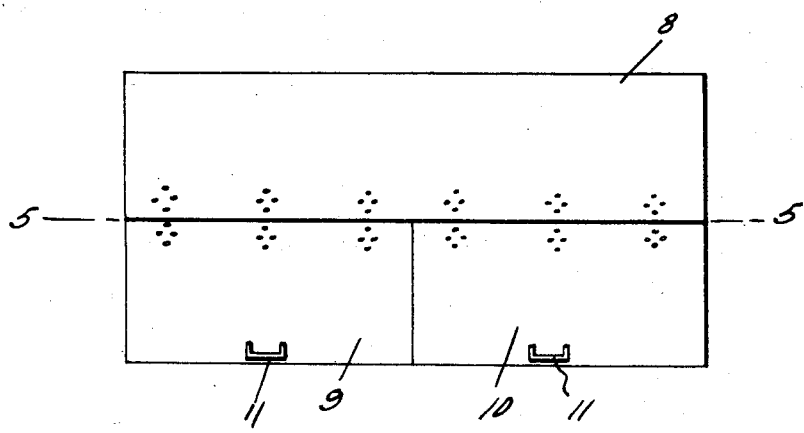
Figure 2 is a top plan view of Figure 1.
Figure 3:
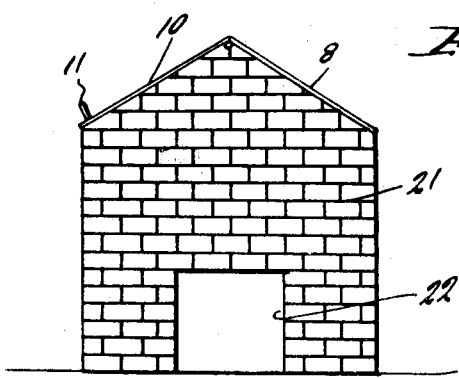
Figure 3 is an end elevation observing the structure in a direction from right to left in Figure 1.

The enclosure or housing is in the nature of a longitudinally elongated substantially rectangular relatively low oven designated generally by the numeral 7 and of the end elevational shape represented in Figures 3 and 4. Incidentally however the top of the oven might well be substantially flat but is preferably V-shaped and includes a stationary roofing plate 8 on one side and a pair of covers 9 and 10 on the other side. These covers are provided with appropriate handles 11 and are hingedly attached to the adjacent edge of the stationary plate as indicated at 12 in Figure 6.

These covers are designed to facilitate access and to expedite insertion and removal of the food products. In the drawings I have shown portions of meat, each product being designated by the numeral 13 as seen in Figure 5. These meat products are supported on horizontal longitudinally spaced rods 14 suitably supported in the upper portion of the oven and dividing said oven into upper and lower compartments, the upper compartment being distinguished by the numeral 15.

These rods are so arranged as to form a grid. Near the right hand end of the grid is a rectangular slightly inclined plate 16 which serves to accommodate a number of meat products and which itself functions not only as a support or pan, but as a means to cause the grease to gravitate toward the center. Incidentally the grease is shown as dropping from the left hand end of the plate into the underlying end of a grease collection and discharge trough 17. This trough is substantially arcuate in cross section and is supported on the lower part 18 of the left hand end wall 19.

In this connection I might also state that the side walls are represented by the numerals 20 and the opposite or right hand end wall is distinguished by the numeral 21. The last named wall is provided with a substantially cubical hole 22 constituting an air intake to promote a circulation, to provide the desired draft and to supply air to the fire.

The fire is preferably made from a readily combustible hickory log and is confined to the firebox distinguished by the numeral 23. At this time I call attention to the numeral 24 which defines the left hand end of said firebox and also constitutes a support for the adjacent end of the trough 17.

Earth 25 is packed between the partition walls 24 and the short end wall 18 to serve as a support for the trough. In connection with the trough it will be noted in Figure 4 that it is provided with a central grease discharge channel or groove 26, and the discharge end extends through the irregularly shaped openings 27 in the wall 19 to empty the grease into a bucket or receptacle 28.

As before implied, in carrying the inventive conception into actual practice, I have found it expedient and practical to organize the parts as depicted in Figure 5. It will be observed here that the arrangement is quite simple and promotes economy in operation, as well as satisfactory results in subjecting the meat products to the cooking action.

The bars 14 constituting the grid are so related as to cause the grid as a unit to slant slightly from right to left. Moreover, the bars are so spaced as to facilitate free circulation of the heated air from the lower into the upper compartment. That portion of the grid directly over the firebox is equipped with the plate 16 so as to prevent the flame from the fire from impinging directly on the meat products supported on said plate. Then too, this plate is inclined so that it serves somewhat as a grease accumulating and discharging pan.

This discharge end is located in superposed relation above the trough 17 so that practically all of the grease is allowed to drip into said trough. The trough itself is inclined to cause the grease to gravitate therefrom into the bucket 28 where it can be retrieved for subsequent use.

Particular stress is laid on the arrangement whereby the outer wall 18 co-operates with the partition 14 in defining a pocket which is filled with earth and on which the central portion of the trough rests. It is believed advantageous also to so inter-relate the pan and trough as to define the air circulation space and to allow for appropriate draft and combustion, and to promote unimpeded passage of the heated air to subject the meat products in the compartment 15 to the cooking action of said heated air.

The idea of having the draft holes 22 near the bottom and center of the wall 21 with the irregularly shaped outlet 27 at the opposite end and above the trough 17 is important. Moreover, the utilization of a comparatively low brick oven with the hinged doors to facilitate access is an added feature.

In practice it is obvious that the meat products are placed into the compartment 15 by way of the doors 9 and 10. Any number of portions of meat may be inserted according to the discretion of the operator. The products are partly supported on the open work portion of the grid and partly supported on the plate 16.

A log fire is preferably used and I find it especially practical to use hickory logs. A bucket 28 is placed near the discharge end of the trough 17, and it is obvious that under this arrangement the meat is subjected to the action of flame and heat, as well as to the action of the smoke and it has been found that this cooking action produces a delicious tasty flavor in the meat different from that found in other barbecue cooking machines and ovens.

The process here involved covers a structure which is such as to enable the air currents to be so controlled as to cause the heat to cook the meat in an even temperature and this is quite important in a machine of this kind. I shall not however, attempt to delve into the various commercial phases of the advantages derived in the handling of meat in this fashion. Nor do I find it necessary to incorporate laudatory remarks as to the actual taste of the products cooked in this oven. I rely for novelty upon the structural details and their specific co-ordination.

It is thought that the description taken in connection with the drawings will enable a clear understanding of the invention to be had. Therefore, a more lengthy description is thought unnecessary. While the preferred embodiment of the invention has been shown and described, it is to be understood that minor changes coming within the field of invention claimed may be resorted to if desired.

I claim:

1. In an oven structure of the class described, a housing provided on its interior with a meat supporting grid located near the upper portion thereof, a central vertical partition in said housing defining one end of a firebox, a pan forming plate supported on that portion of the grid just over the firebox, earth packed in said housing between said partition and an adjacent end wall, a juice collecting and discharging trough supported on said partition wall and earth extending through an opening in the adjacent end wall of the housing, said plate overlying one end of said trough in the manner specified.

2. An oven structure for cooking meat barbecue style having side and end walls and a roof provided with oppositely and downwardly inclined portions, one of which is relatively fixed, and the other of which is swingable and is hingedly connected to said one portion; a downwardly inclined grid supported between said side walls and extending from substantially one end wall to the other end wall, a partition extending between the side walls, and having an upper edge spaced downwardly from said grid, a firebox at one side of said partition, a downwardly inclined trough supported by said partition and the end wall remote from the firebox, and imperforate means on the upper portion of said grid in a manner to direct grease into said trough.

3. In an oven of the class described, a housing provided adjacent one end with a firebox, and adjacent its other end with a support consisting of a mound of packed earth and having a downwardly inclined top side, a trough supported on said mound and having a lower end extending outwardly of said housing, a downwardly inclined grid supported in said housing and having its lower end disposed immediately above said trough and its upper end arranged over the firebox, and a plate supported on the upper portion of the grid for directing grease into said trough.

In testimony whereof I affix my signature.

JULIUS WILLIAM CAIN.